(No Model.)
S. E. HURLBUT.
BOX.
No. 519,578. Patented May 8, 1894.
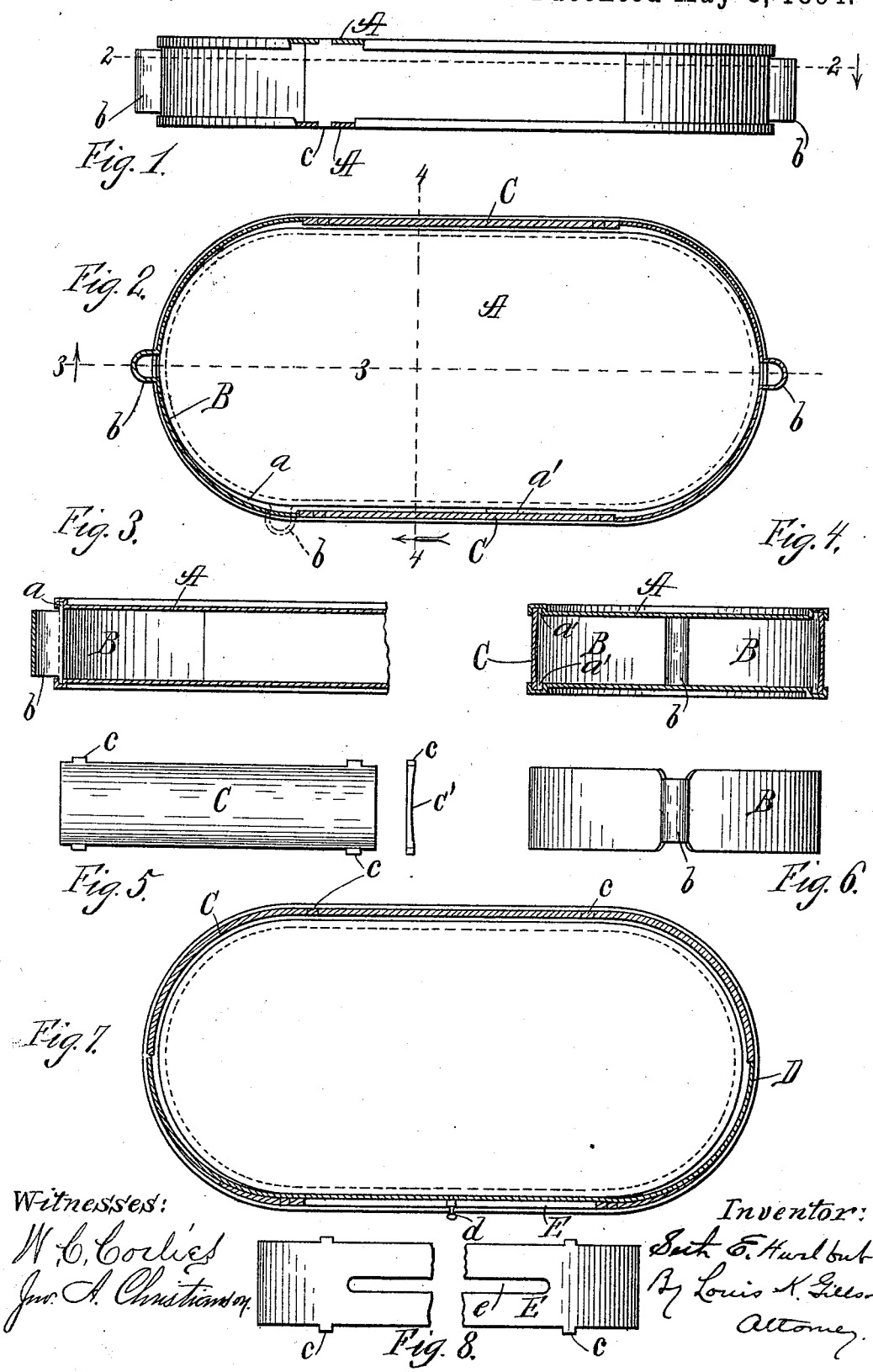

UNITED STATES PATENT OFFICE.

SETH E. HURLBUT, OF CHICAGO, ILLINOIS.

BOX.

SPECIFICATION forming part of Letters Patent No. 519,578, dated May 8, 1894.

Application filed February 8, 1894. Serial No. 499,512. (No model.)

*To all whom it may concern:*

Be it known that I, SETH E. HURLBUT, a citizen of the United States, residing at Chicago, in the county of Cook and State of Illinois, have invented certain new and useful Improvements in Boxes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates particularly to boxes intended to be carried in the pocket, as match safes, or as receptacles for change or car tickets.

Its object is to provide an article of this class which will be of convenient shape and easily openable, but locked against accidental opening.

It consists of a box having open rounded ends, closed by sliding flexible cover pieces.

In the drawings, Figure 1, is an edge elevation of the box. Fig. 2, is a plan section on the line 2—2 of Fig. 1. Fig. 3, is a sectional view on the line 3—3 of Fig. 2. Fig. 4, is a similar view on the line 4—4 of Fig. 2. Fig. 5, shows details of an edge of the box. Fig. 6, shows a detail of the sliding cover. Fig. 7, is a similar view to Fig. 2, showing a modified form of cover. Fig. 8, is a detail of the edge of the box used in this form.

The box is usually of sheet metal and of such size as to be conveniently carried in the pocket. It has two parallel sides, A, which are oblong, their corners being rounded,—as shown the ends are in the form of semi circles. These sides are stamped out with dies and formed with continuous grooves, a, a', near their edges to serve as ways for the sliding cover pieces, B, which are of thin strips of spring metal, or other elastic material, and whose width is substantially equal to the thickness of the box. The edge walls, C, of the box are perpendicular to the sides and are somewhat thicker than the cover pieces. These walls are formed with projecting lugs, c, c, adapted to be inserted through apertures in the sides, A, and clinched for the purpose of holding the box together. The grooves a, extending around the ends of the box, are at its extreme ends and for a short distance in each direction of a width corresponding with the thickness of the cover pieces, B. Approaching the edge walls, C, these grooves widen, their inner sides being further removed from the edges of the sides A, until they attain a width sufficient to admit of the edge walls, C, being set into them and still leave the grooves, a' along the inner sides of these walls, of sufficient width to receive the cover pieces, B. The ends of the edge walls, C, serve as stops for the cover pieces, B, which are of sufficient length to extend from the end of one edge wall around the end of the box to the end of the edge wall upon the opposite side of the box. The sliding covers are formed with a less degree of curvature than the ends of the box so that they tend to spring outwardly and thus insure contact with the ends of the edge walls. Each of the cover pieces, B, is formed with an outwardly projecting finger piece, b, midway of its length whereby it may be moved.

To open the box pressure is applied to one of the cover pieces, B, near one of its ends, to force it inwardly from the end of the edge wall, C, against which it abuts. By applying slight force to the finger piece, b, the cover piece may now be slid along the groove, a', its opposite end receding from the edge wall upon the opposite side and leaving an opening to the interior of the box. The sliding cover for each end may be moved in either direction. The finger piece, b, serves also as a stop to limit the movement of the cover piece, B, by contact with the edge wall.

In the form shown in Fig. 7, one of the edge walls, C, is prolonged to reach to the ends of the box and a single sliding cover piece, D, is used, and extends behind the outer edge wall, E, between the ends of the prolonged edge wall whose ends serve as shoulders for it to abut against. In this construction the width of the grooves forming ways for the cover piece is uniform. The shorter edge piece, E, is longitudinally slotted as shown at e. The sliding cover piece is provided with a finger piece, d, which projects through this slot. The action is the same as in the previously described form, the cover piece moves in either direction after being freed by pressure from contact with the end of the edge wall. The inner surfaces of the edge walls, C, D, E, are slightly concave longitudinally as shown at $c'$, in either construction, so that the cover pieces have bearings only at their edges as they slide, thereby preventing abrasion across their entire faces.

I claim as my invention—

1. A box having rounded open ends, in combination with a flexible, sliding cover piece, formed of spring material adapted to close each end, ways for the cover piece, and stop shoulders to receive the ends of the cover piece when in position to close the box opening, substantially as described.

2. In a box having flat sides and rounded open ends and whose edges are perpendicular to its sides, the combination with the side pieces, A, having grooves or ways, $a, a'$, in their inner faces near their edges, rigid edge walls, C, and flexible cover pieces formed of spring material adapted to run in the ways, $a, a'$, and close the open ends of the box, the ends of the cover pieces abutting against the ends of the edge walls when the box is closed, and tending to spring outwardly, substantially as described and for the purpose specified.

3. In a box having openings in its edges, the combination with side pieces, ways in said pieces extending across the openings and being prolonged beyond such openings, of rigid edge walls for uniting the side pieces, stop shoulders at each side of the openings, flexible slides of spring material tending to assume a straight position, adjusted to said ways for closing the openings, said slides being adapted to have their ends abut against the stop shoulders when the box is closed, substantially as described and for the purpose specified.

4. In a box having openings in its edges, the combination with side pieces, ways in said pieces extending across the openings and being prolonged beyond such openings, of rigid edge walls for uniting the side pieces, flexible slides of spring material tending to assume a straight position, adjusted to said ways for closing the openings, substantially as described and for the purpose specified.

In testimony whereof I affix my signature in presence of two witnesses.

SETH E. HURLBUT.

Witnesses:
SPENCER WARD,
M. H. L. WING.